(12) United States Patent
Giannopoulos (10) Patent No.: US 8,981,753 B2
(45) Date of Patent: Mar. 17, 2015

(54) CURRENT-SENSING AUTO-CALIBRATION IN POWER CONVERTERS

(75) Inventor: Demetri J. Giannopoulos, Austin, TX (US)

(73) Assignee: Intersil Americas LLC, Milpitas, CA (US)

( * ) Notice: Subject to any disclaimer, the term of this patent is extended or adjusted under 35 U.S.C. 154(b) by 281 days.

(21) Appl. No.: 13/534,785

(22) Filed: Jun. 27, 2012

(65) Prior Publication Data

US 2013/0249518 A1 Sep. 26, 2013

Related U.S. Application Data

(60) Provisional application No. 61/614,305, filed on Mar. 22, 2012.

(51) Int. Cl.
*H02M 3/156* (2006.01)
*H02M 1/00* (2006.01)

(52) U.S. Cl.
CPC ...... *H02M 3/156* (2013.01); *H02M 2001/0009* (2013.01)
USPC .......................................................... 323/284

(58) Field of Classification Search
CPC . H02M 3/156; H02M 3/1588; Y02B 70/1466
USPC .................. 323/222, 241, 280–285
See application file for complete search history.

(56) References Cited

U.S. PATENT DOCUMENTS

| 7,262,628 | B2 | 8/2007 | Southwell et al. | |
|---|---|---|---|---|
| 7,358,710 | B2 * | 4/2008 | Luo et al. | 323/282 |
| 7,986,254 | B1 | 7/2011 | Lakshmikanthan et al. | |
| 8,278,895 | B2 * | 10/2012 | Gardner et al. | 323/282 |

OTHER PUBLICATIONS

Zhang et al.; "Online Calibration of MOSFET On-State Resistance for Precise Current Sensing;" IEEE Power Electronics Letters, vol. 2, No. 3, Sep. 2004; pp. 100-103.

* cited by examiner

*Primary Examiner* — Adolf Berhane
*Assistant Examiner* — Yemane Mehari
(74) *Attorney, Agent, or Firm* — Meyertons Hood Kivlin Kowert & Goetzel, P.C.; Jeffrey C. Hood (57) ABSTRACT

An electronic circuit (EC) may include an integrated current-source with an output terminal that may couple to the output of a power converter (OPC) to draw current from the power converter. The EC may further include control circuitry for activating the integrated current-source and for effecting a ramping output voltage at the OPC, and begin current-sense calibration once the output voltage reaches a specified calibration voltage value (SCVV). The control circuitry may regulate the output voltage to the SCVV while current-sense calibration is being performed, to measure and store the resistance value of a current-sense element of the power regulator. With the current-sense calibration complete, the control circuitry may disable the integrated current-source, resume ramping the output voltage until it reaches a specified regulation value (SRVV), and regulate to the SRVV during normal operation. The SCVV is specified to be at least a magnitude lower than the SRVV.

38 Claims, 5 Drawing Sheets

CURRENT-SENSING AUTO-CALIBRATION IN POWER CONVERTERS

PRIORITY CLAIM

This application claims benefit of priority of U.S. provisional application Ser. No. 61/614,305 titled "Current Sensing Auto-Calibration in Power Converters", filed Mar. 22, 2012, which is hereby incorporated by reference in its entirety as though fully and completely set forth herein.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION

Figure 1:
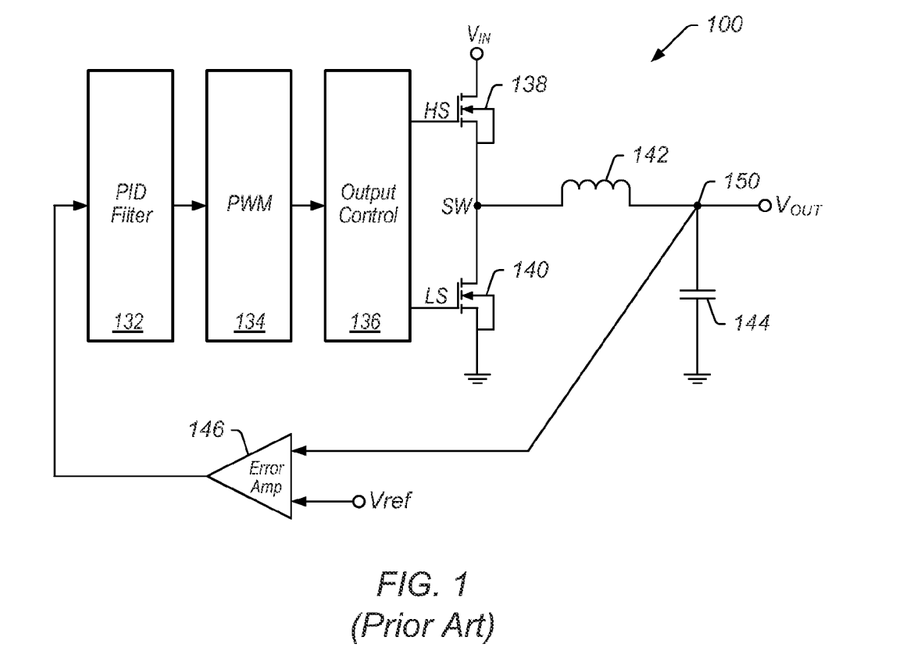
FIG. 1 shows a simplified circuit diagram of a prior art buck converter power regulator.

DC-to-DC voltage conversion is often performed by switching power regulators, or step-down regulators, also referred to as voltage regulators or point-of-load (POL) regulators/converters, converting a higher voltage (e.g. 12V) to a lower value as required by one or more load devices. A common architecture features distribution of the higher voltage to multiple power regulators, each producing a different (or possibly the same) voltage to one or more loads. Switching power regulators often use two or more power transistors to convert energy at one voltage to another voltage. One common example of such a power regulator 100, commonly called a "Buck Regulator" is shown in FIG. 1. Buck Regulator 100 typically switches a pair of power transistors (138 and 140) in order to produce a square-wave at the transistors' common node SW. The produced square-wave can be smoothed out using an LC circuit comprising inductor 142 and capacitor 144 to produce the desired voltage, $V_{out}$. A control loop, comprised of an Error Amplifier 146, a Proportional-Integral-Differential (PID) Filter 132, a Pulse-Width-Modulator (PWM) 134, and an Output Control circuit 136, can be configured to control the duty-cycle of the output square-wave, and hence the resulting value of $V_{out}$.

Power regulators (power converters) such as power regulator (or voltage regulator) 100 shown in FIG. 1, for example, usually include a mechanism for load current measurement. Load current measurement in power converters is used for safety, monitoring operating conditions, current sharing in multi-phase applications and current-mode feedback control, among others. Specifically load current-sensing is typically used to detect excessive load current due to faults such as short-circuiting of the output. Power converters using programmable digital controllers with a digital interface can report the load current to a remote monitoring unit. Furthermore load current-sensing is used in multi-phase systems to ensure equal distribution of the load current among two or more paralleled modules. The accuracy of the current-sensing method is limited however by the manufacturing tolerance of the current-sense element. In order to improve the accuracy of the current measurement, it is desirable to implement a current-sensing auto-calibration method to measure the resistance of the current-sense element.

Current-sensing methods can be either lossy or lossless. Lossy methods typically provide a current-measurement of high accuracy at the expense of additional significant power losses. Lossless methods typically do not introduce any additional power losses but their accuracy is limited by the manufacturing tolerance of the element (or elements) used to measure the current-value. For the most part, auto-measurement and calibration methods applied to a buck power converter (such as the one shown in FIG. 1) may require two measurements, one taken before the calibration, and a second measurement taken during calibration, and may further require multiple discrete components, and/or precision components to perform the necessary calibration.

Auto-Calibration Method

Figure 7:
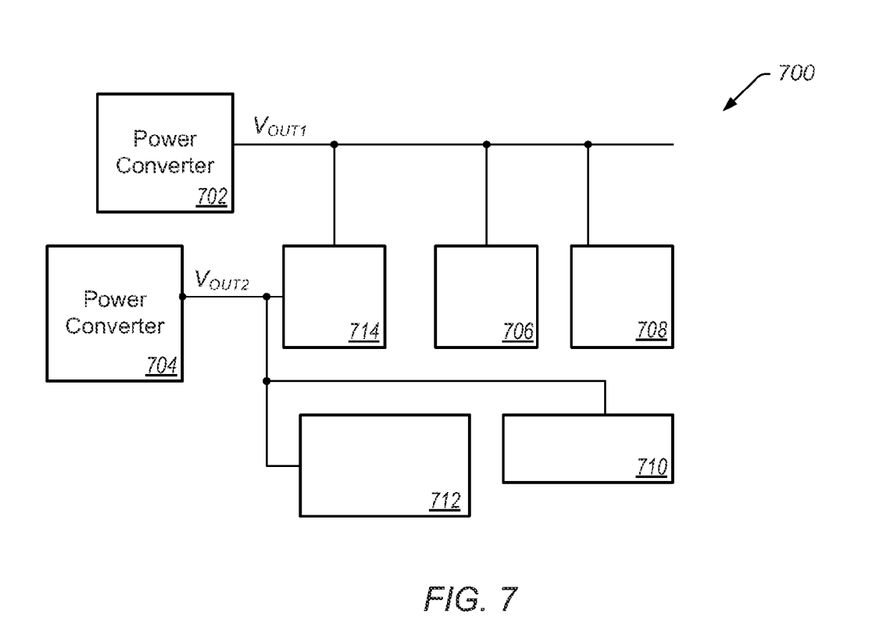
FIG. 7 shows a block diagram of one embodiment of a system that includes power converters.

FIG. 7 shows one embodiment of a system that includes power converters. In system 700, power converters 702 and 704 are used to provide supply voltage for various system components 706-714. System components 706-714 may include various digital and/or analog functional blocks. Examples of such blocks include processing elements (e.g. microcontrollers, microprocessors, application specific processing circuits, etc.), memory elements, digital-to-analog converters, amplifiers, and/or any other similar components. Each system component may itself include sub components and/or additional power converters if necessary, and so on and so forth. Some power converters may provide supply voltages to more than one system component/block, and some system components may receive supply voltage from more than one power converter. For example, in the embodiment shown, system component 714 receives supply voltage $V_{OUT1}$ from power converter 702, and also receives supply voltage $V_{OUT2}$ from power converter 704. One or more of the power converters in system 700 may include elements such as those shown in FIGS. 2 and 3, which will be discussed in detail further below.

As previously mentioned, it may be beneficial to provide a current-sensing auto-calibration method for power converters, such as power converters 702 and 704 for example, without having to resort to a precision component such as a calibration resistor, and without requiring any additional discrete components besides what may be included in the electronic control circuit used for the power converter. For example, it may be beneficial to provide a current-sensing auto-calibration method does not require any additional discrete components besides a digital controller integrated circuit (IC) in the application, and requires no more than a single measurement in the calibration process. Accordingly, an IC may be designed to have a first pin intended to couple to an output node of a power regulator, and the IC may include an integrated current-source with an input terminal coupled to the first pin. The IC may also include control circuitry adapted to activate the integrated current-source, and effect a ramping output voltage at the output node of the power regulator once the integrated current-source has been activated, and begin current-sense calibration once the output voltage reaches a specified calibration voltage value. The IC may regulate the output voltage to the specified calibration voltage value while current-sense calibration is being performed until the current-sense calibration has completed, and disable the integrated current-source once the current-sense calibration has completed. The specified calibration voltage value is specified to be less than a specified regulation voltage value to which the output voltage is regulated during normal operation. In some embodiments, the specified calibration voltage value is at least one order of magnitude les than the specified regulation voltage value.

Once the integrated current-source has been disabled upon completion of the current-sense calibration, the control circuitry within the IC may operate to resume ramping the output voltage of the power regulator until it reaches the specified regulation voltage value, and continue regulating the output voltage to the specified regulation voltage value as part of a regular operation of the power regulator. During the current-sense calibration, the control circuitry within the IC may determine the value of a current-sense element configured in the power regulator. In some embodiments, the current-sense element is the DC resistance of a low side transistor device configured in the output power stage of the power regulator. The IC may also include non-volatile memory to store the determined value of the current-sense element, which may then be used by the control IC to measure a current flowing through the current-sense element during regular operation of the power regulator.

To determine the value of the current-sense element, the control circuitry in the control IC may measure a voltage drop developed across the current-sense element responsive to the integrated current-source sinking current from the output stage of the power regulator. To determine how long the current-sense calibration is performed, the control circuitry may consecutively measure the voltage drop multiple times, and complete the current-sense calibration when a difference between two consecutive measurements of the voltage drop is less than a specified percentage, for example less than 1%. The control IC may include a current-sense amplifier to sense/measure the voltage drop across the current-sense element, and ADC (analog to digital converter) circuitry to generate a numeric value thereof for calculating the value of the current-sense element. The control circuitry may increase the gain of the current-sense amplifier during current-sense calibration to reduce an impact of quantization error that might result from a low value of the current sunk by the integrated current-source during current-sense calibration. The IC may also store, in a non-volatile memory element, the measured value of the current sunk by the integrated current-source during a calibration of the integrated current-source, to account for process variations during manufacturing of the integrated current-source.

Figure 2:
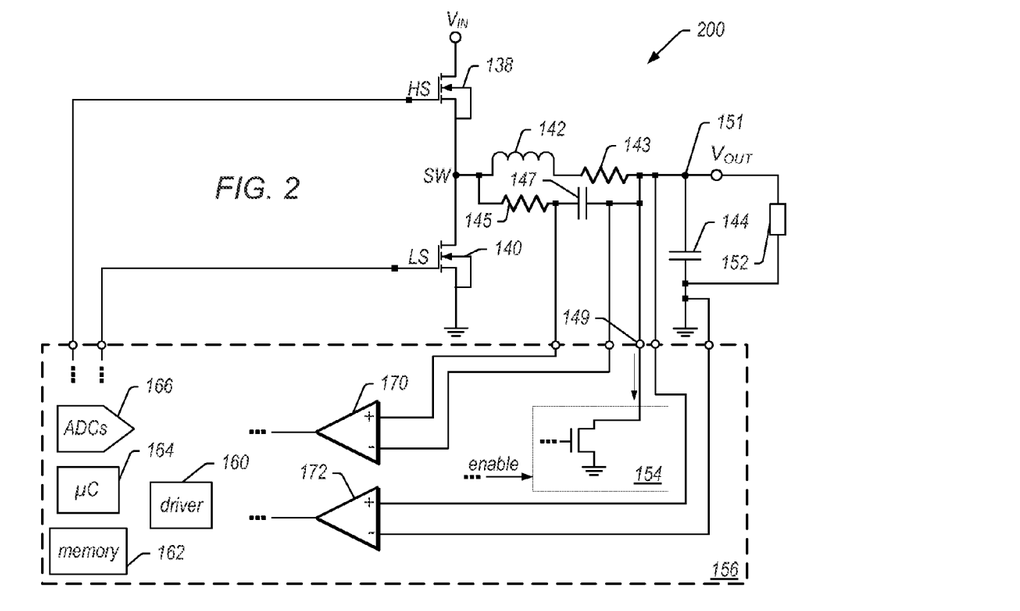
FIG. 2 shows a simplified circuit diagram of one embodiment of a digital controller IC used to perform DCR (Direct Current Resistance) current-sense auto-calibration for a buck converter.
Figure 3:
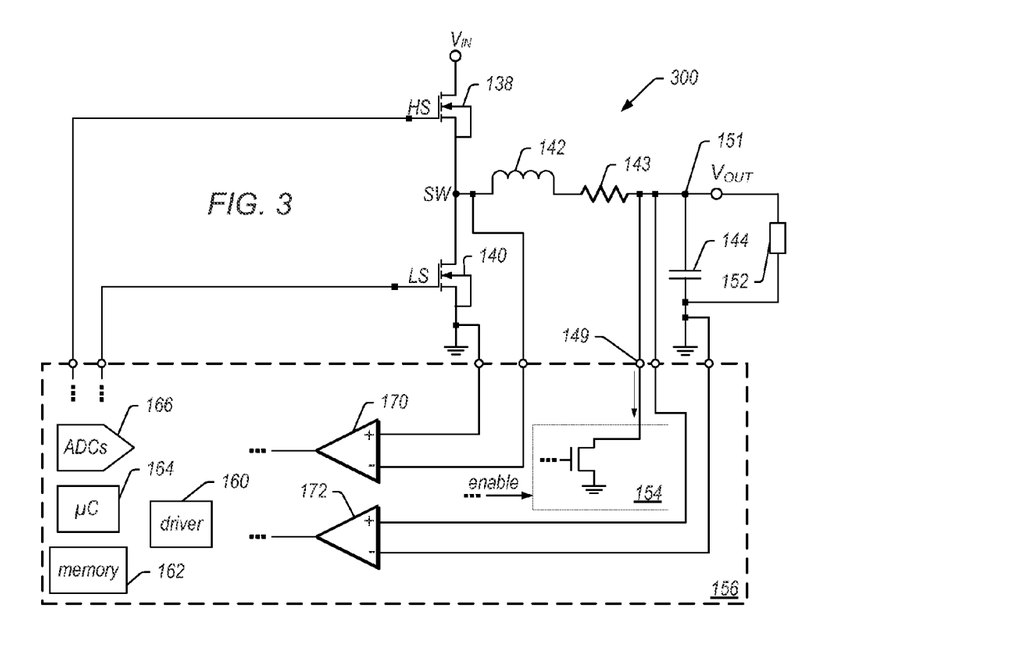
FIG. 3 shows a simplified circuit diagram of one embodiment of a digital controller IC (Integrated Circuit) used to perform $R_{DSon}$ (Drain-Source On-Resistance) current-sense auto-calibration for a buck converter.

FIG. 2 shows a simplified circuit diagram of a power converter application for a DCR current-sense method where the current-sense element is the DCR of the inductor 142. FIG. 3 shows a simplified circuit diagram of a power converter application for a $R_{DSon}$ current-sense method where the current-sense element is the $R_{DSon}$ resistance of the power switch 140. The applications (systems) 200 and 300 may each include a control circuit, which may be a digital controller, for example digital controller 156, which may be implemented as an integrated circuit (IC). Digital controller 156 may include driver circuitry 160 to provide appropriate drive signals to switching devices 138 and 140, one or more ADCs 166 (Analog to Digital Converters) to generate digital versions of sensed analog signal values, and a processing unit 164 to provide overall control over the operation of controller 156. Digital controller 156 may also include an integrated voltage-sense amplifier 172, an integrated current-sense amplifier 170, and an integrated current-source (sink) 154, which is coupled to the load 152 via node 151. Resistor 145 and capacitor 147 are used to provide the appropriate signals to integrated voltage-sense amplifier 172, integrated current-sense amplifier 170, and integrated current-source 154 as required for each current-sense method. Resistor 143 represents the DC resistance of inductor 142. The current-source 154 may be calibrated during the production testing of the digital controller 156 prior to its installation, for example into an application printed circuit board (which may include the entire system 200 and/or 300 as desired), and may be used in the current-sensing auto-calibration process. The current-source 154, when activated in the application, may be operated to force a precisely known current through the designated current-sense element, that is, through inductor 142 in system 200, and through transistor device 140 in system 300.

The digital controller IC 156 may include non-volatile memory 162 to store information and data used during calibration of the electrical parameters (offset, gain) of the current-sense amplifier 170 and during calibration of the current-source value. These calibrations may all be performed during production testing. For instance, the offset of the current-sense amplifier 170 may be measured, digitized and stored in the non-volatile memory 162 during calibration of the electrical parameters of current-sense amplifier 170. During normal operation, the stored offset value may be subtracted from the measured voltage drop across the current-sense element. The calibration of the current-source value may include connecting a power supply, which may be part of the production test set-up, to the $V_{OUT}$ pin 149 of the controller 156, applying a fixed voltage, and measuring the current that is sinking into the $V_{OUT}$ pin 149. The measured current value may then be stored in the non-volatile memory 162, on-chip.

When the current-sense amplifier 170 in the digital controller 156 is calibrated during production testing, the main contributor to the current-sensing error during normal operation is the manufacturing tolerance of the current-sense element resistance. Various embodiments of the auto-calibration method described herein may use the calibrated current-source 154 to measure the actual current-sense element resistance, produce a digital value representative of that resistance, and store the digital value in memory 162. The stored resistance value may then be used to accurately measure the current flowing through the sense element by measuring the voltage drop across the sense element, and dividing the voltage with the stored value of the current-sense element resistance.

Determining the value of the current-sense element resistance may be performed using no more than a single measurement during which the calibrated current-source 154 is applied, and the voltage drop across the current-sense element is measured. The current drawn by the load 152 during the current-sensing auto-calibration process may be negligible in comparison to the value of the current drawn by calibrated current-source 154. To achieve this, the current-sense auto-calibration may be performed while the output voltage $V_{OUT}$ across the load 152 is regulated at a value $V_{OUT\_ical}$ that is much lower than the typical regulation voltage value $V_{OUT\_reg}$ required by the specific load 152 during normal operation. In some embodiments $V_{OUT\_reg}$ might be in a voltage range that is about an order of magnitude higher than the voltage range containing $V_{OUT\_ical}$. For example, $V_{OUT\_ical}$=0.15V may be chosen for a load that requires a typical regulation voltage $V_{OUT\_reg}$=3.3V. The regulation of the output voltage $V_{OUT}$ at $V_{OUT\_ical}$ may take place at the beginning of the output voltage ramp as the voltage rises to the normal operating value $V_{OUT\_reg}$. This will be shown in further detail with respect to timing diagram 400 in FIG. 4.

Another advantage of keeping $V_{OUT\_ical}$ at a very low value relative to the nominal regulation voltage $V_{OUT\_reg}$ of the load 156 is the reduction of the power consumption in the current-source 154. Low power consumption (e.g. a few hundred mW) makes it possible to integrate the current-source 154 in the controller IC 156, to eliminate the need for external discrete components. The elimination of external discrete components may reduce the footprint of the entire system.

The measurement of the current-sense element resistance during the current-sensing auto-calibration process may be accompanied by the measurement of the temperature of the sense element, which may also be carried out by the digital controller 156. This enables controller 156 to determine the temperature coefficient of the current-sense element from the measured temperature(s) and the measured resistance(s) of the current-sense element. By storing the known temperature coefficient of the sense-element resistance in non-volatile memory 162, and by monitoring the temperature of the sense element during operation, the current-measurement error due to temperature dependency of the current-sense element resistance may be reduced.

Current-Sense Auto-Calibration Sequence

Figure 4:
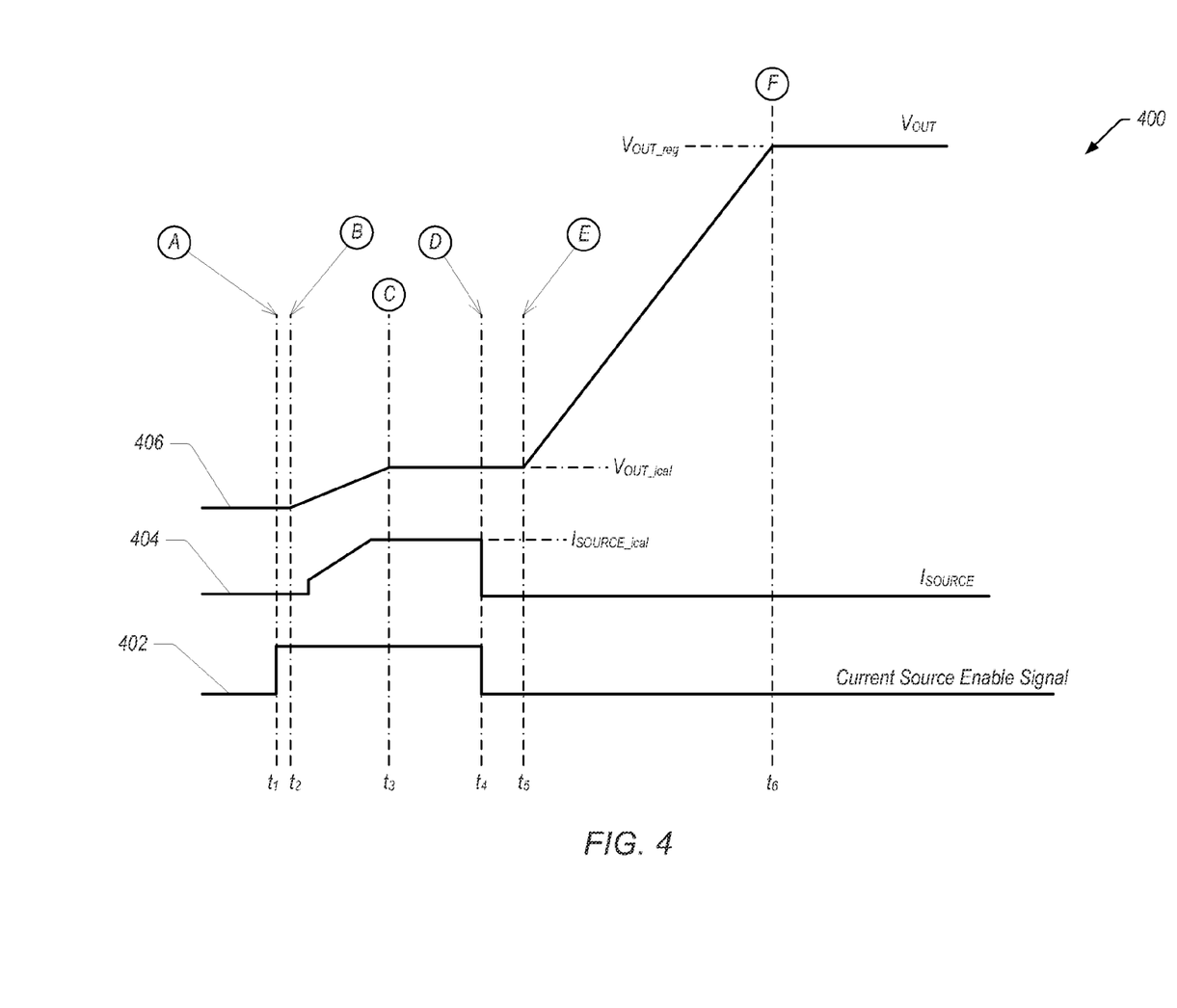
FIG. 4 shows a timing diagram for the output voltage and source current during current-sense auto-calibration according to one embodiment.

The current-sense auto-calibration may take place shortly after the start of the output voltage ramp (i.e. the voltage ramp that appears at node 151). FIG. 4 shows a corresponding timing diagram 400, with one embodiment of a related sequence shown in the flow chart 500 in FIG. 5. In the embodiments detailed herein, no output voltage pre-biasing is assumed.

As shown in the timing diagram 400, at time t=$t_1$ the on-chip ground-referenced sinking current-source 154 is activated. The current-source may require a minimum voltage $V_{i\_min}$ across it to maintain its fixed current value $I_{SOURCE\_ical}$. At t=$t_1$ the voltage across the current-source is zero, and the sourced/sinked current is also zero. At t=$t_2$ the switching of the power converter begins. The output voltage $V_{OUT}$ starts ramping towards its regulation value $V_{OUT\_reg}$. As the output voltage increases, the value of the current-source $I_{SOURCE}$ begins to increase as well. When $V_{OUT}$ reaches a specific value $V_{OUT\_ical}$ ($V_{OUT\_reg}$>$V_{OUT\_ical}$>$V_{i\_min}$) at t=$t_3$, the power converter is operated to regulate the output voltage to $V_{OUT\_ical}$ until t=$t_4$. The current drawn by the current-source 154 reaches its calibrated fixed value $I_{SOURCE\_ical}$ at a point in time between $t_2$ and $t_3$. The current-sense auto-calibration may therefore take place in the time interval [$t_3$, $t_4$], that is, between points (C) and (D) as shown in timing diagram 400.

As previously mentioned, the calibrated value of the current-source 154 has been stored in the memory 162 of the programmable controller 156 during production testing and calibration of the controller 156. During the current-sense calibration period [between points in time $t_3$ and $t_4$] the current-sense circuitry measures the voltage drop $V_{sense\_ical}$ equal to $R_{sense}*I_{SOURCE\_ical}$ across the current-sense element of value $R_{sense}$. At the end of the period [i.e. at or shortly after point in time $t_4$] the current-sense element value $R_{sense}$ may be calculated based on the formula: $R_{sense}$=$V_{sense\_ical}$/ $I_{SOURCE\_ical\cdot[T_1]}$ It should be noted that it may be preferable to measure the voltage drop $V_{sense\_ical}$ across the current-sense element at a point in time during the switching period when any effect on the measurement by a potential ripple current component of the inductor current is within specified expected boundaries.

Before the accurate measurement of the value of the current-sense element at the end of the calibration interval [$t_3$, $t_4$], a typical (less accurate) value of the current-sense element may be used for short circuit and over-current protection. Following the current-sense calibration interval, the calculated $R_{sense}$ value may be used to derive the load current-value flowing through the current-sense element from the measured $V_{sense}$ voltage across the sense element.

The duration of the calibration interval [$t_3$, $t_4$] may be determined by the speed of the controller 156 in calculating $R_{sense}$ (that is, how much time controller 156 needs to make the required measurements and calculation to obtain the value $R_{sense}$), and the duration of the time period it takes for the power stage to reach steady-state after the current-source has reached its fixed value $I_{SOURCE\_ical}$. A criterion for determining $t_4$ may be the difference between two consecutive measurements of $R_{sense}$. For example, $t_4$ may be reached once the difference between two consecutive measurements of $R_{sense}$ is less than a pre-determined percentage error, for instance less than 1%. In other words, controller 156 may take consecutive measurements of $R_{sense}$ (i.e. consecutive calculations of the value of $R_{sense}$), until the difference between two consecutive measured values of $R_{sense}$ is less than a specified percentage.

At the end of the current-sense calibration interval [$t_3$, $t_4$], the calibration current-source 154 may be de-activated. From that point on the calculated value of the current-sense element may be used by the current-sense circuitry of the controller 156 in measuring the current flowing through the sense element. At a later point in time $t_5$, the output voltage ramp may resume, and continue until t=$t_6$, when the output voltage reaches its regulated voltage value $V_{OUT\_reg}$. A summary of the steps that may be taken during the output voltage ramp to perform the current-sense calibration is shown in flow chart 500 in FIG. 5.

Figure 5:
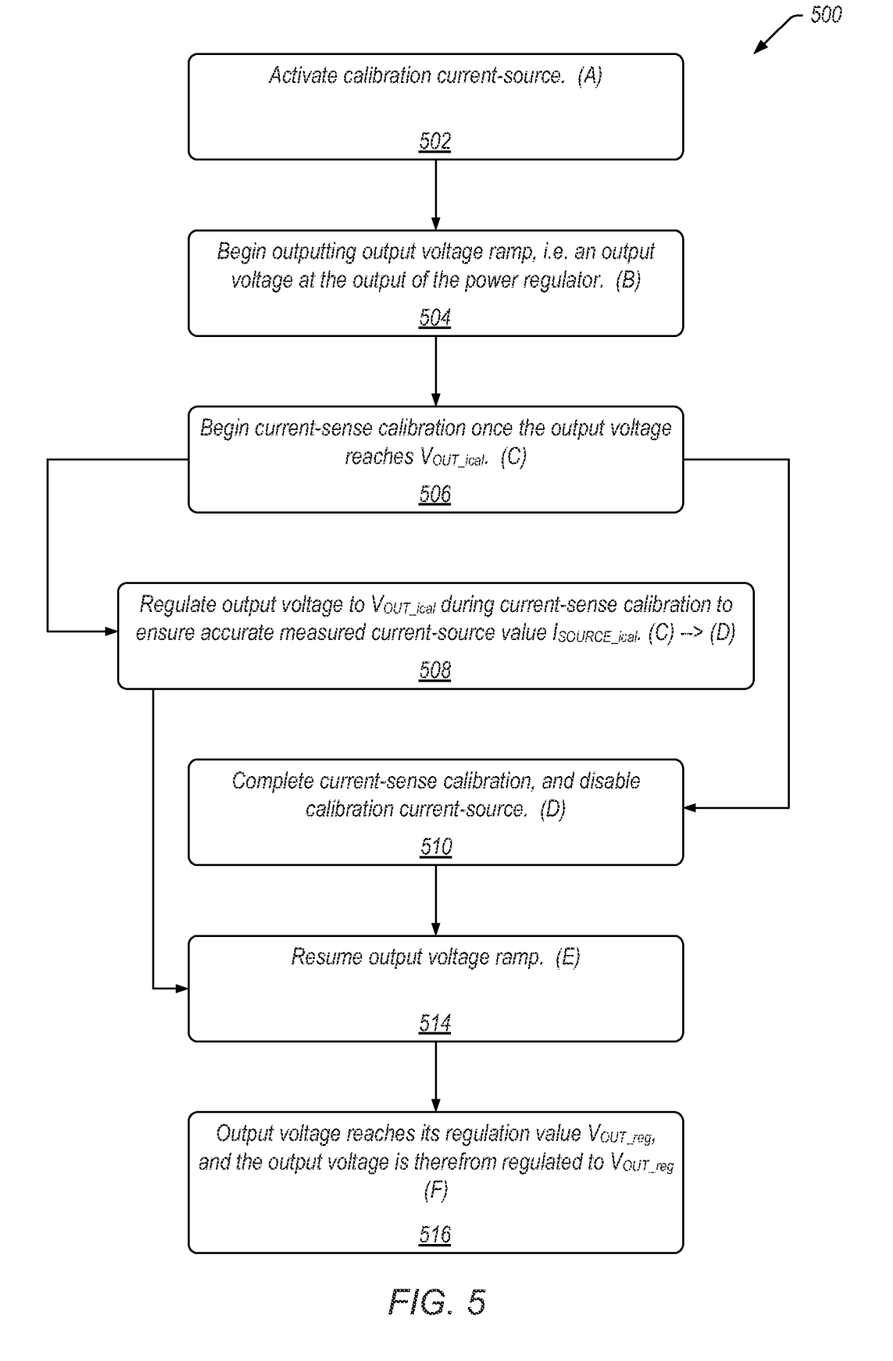
FIG. 5 shows a flowchart illustrating the steps performed during current-sense auto-calibration according to one embodiment.

As shown in flow diagram 500 in FIG. 5, current-sense calibration for a power regulator may start by activating the calibration current-source, e.g. current-source 154 in systems 200 and 300 (502). When related to timing diagram 400 in FIG. 4, 502 may take place at time point (A) shown in timing diagram 400. In response to the current-source beginning to sink current, the power regulator begins outputting a voltage ramp—that is, the output voltage of the power regulator begins to rise (504). When related to timing diagram 400 in FIG. 4, 504 may take place at time point (B) shown in timing diagram 400. Once the output voltage of the power regulator reaches a specified calibration output voltage value $V_{OUT\_ical}$, the current-sense calibration begins (506). When related to timing diagram 400 in FIG. 4, 506 may take place at time point (C) shown in timing diagram 400. During current-sense calibration, the output voltage of the power regulator is regulated to the calibration output voltage value $V_{OUT\_ical}$ to ensure that the measured current-source value $I_{SOURCE\_ical}$ is accurate (508). When related to timing diagram 400 in FIG. 4, 508 may take place between time points (C) and (D) shown in timing diagram 400. Once the current-sense calibration is completed, the current-source is disabled (510). When related to timing diagram 400 in FIG. 4, 510 may take place at time point (D) shown in timing diagram 400. Some time following the completion of the current-sense calibration, the output voltage ramp of the power regulator may resume (514). When related to timing diagram 400 in FIG. 4, 514 may start at time point (E) shown in timing diagram 400. Once the output voltage of the power regulator reaches its normal operating regulation value $V_{OUT\_reg}$, the power regulator continues to regulate the output voltage to the value $V_{OUT\_reg}$ (516). When related to timing diagram 400 in FIG. 4, 516 may occur at time point (F) shown in timing diagram 400.

Selection of Current-Source

The voltage drop $V_{sense}$ across the current-sense element $R_{sense}$ may be digitized on-chip (i.e. on controller 156). In order to reduce the impact of the quantization error on the accuracy of the $R_{sense}$ calculation, the current-source value $I_{SOURCE\_ical}$ may be specified to be equal to the full load flowing through $R_{sense}$ or a significant portion of it.

The implementation of a current-source of a higher value $I_{SOURCE\_ical}$ for given $V_{i\_min}$ may lead to the use of a larger output device. Therefore the die size effectively places an upper limit on the value of the current-source by limiting the size of the current-source output device. Furthermore, a higher current-source value $I_{SOURCE\_ical}$ may increase the power dissipation on-chip. The power dissipation in the output device of the current-source 154 during the current-sense calibration interval may be equal to $I_{SOURCE\_ical}*V_{OUT\_ical}$. The thermal resistance of the package may also place an upper limit on the value of the current-source 154.

For at least the reasons described above, it may therefore be preferable to use a lower current-source value $I_{SOURCE\_ical}$. However, a low current-source value may negatively impact the accuracy of the voltage measurements across the designated current-sense element. The impact of the quantization error due to a low current-source value $I_{SOURCE\_ical}$ on the accuracy of the $R_{sense}$ measurement/calculation may be reduced by increasing the gain of the current-sense amplifier 170 to a higher value during the current-sense calibration time interval [$t_3$, $t_4$]. For example, if the full load current is 10 A and $I_{SOURCE\_ical}$ is set to 1 A, then the gain of the current-sense amplifier 170 may be quadrupled for the duration of the current-sense calibration period. The on-chip current-source 154 may be implemented to sink current. Sourcing a high current of approximately 1 A may significantly complicate the on-chip supply (LDO) that provides the bias voltage for the device, and may significantly increase the power dissipation in the controller IC 156.

One Embodiment of the Current-Source

Figure 6:
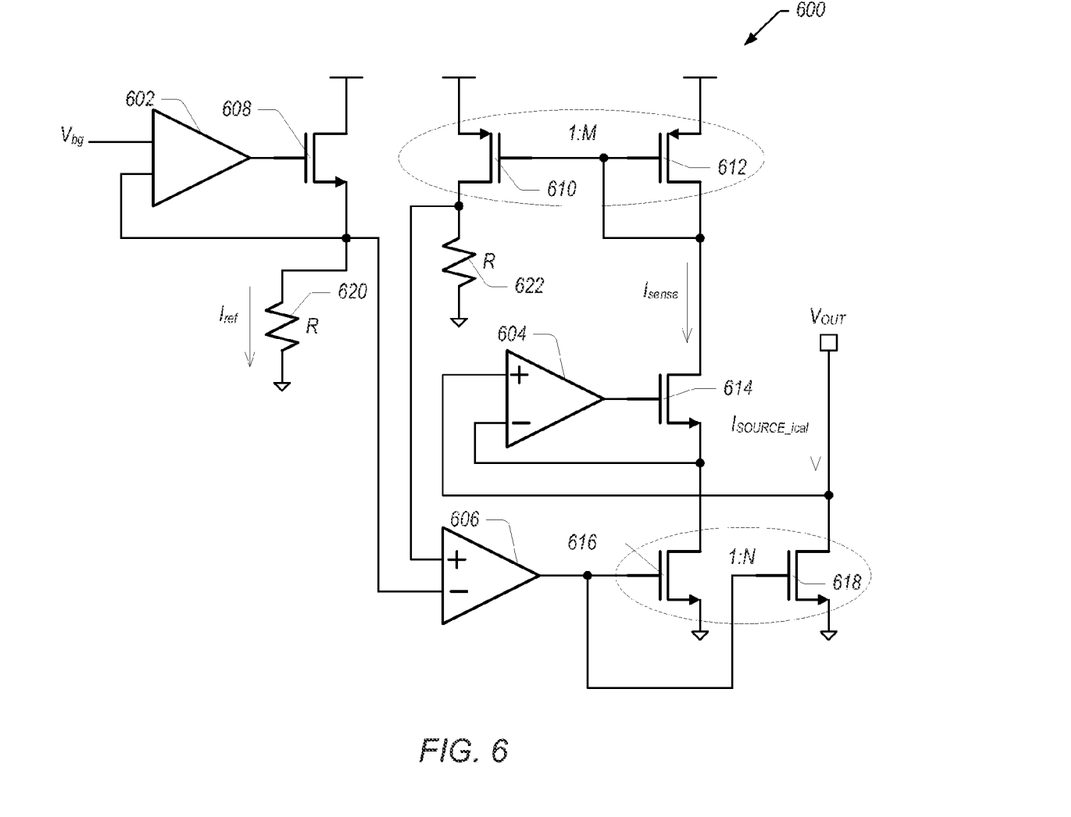
FIG. 6 shows a partial circuit diagram of one embodiment of an integrated current-source used during current-sense auto-calibration.

FIG. 6 shows a simplified circuit diagram of one embodiment 600 of the current-source 154. As shown in FIG. 6, current-source 600 may include three amplifiers 602, 604, and 604. Amplifier 602 may be operated to generate a "reference" current $I_{ref}$ using transistor device 608, with $I_{ref}=V_{bg}/R_{[T3]}$. The $V_{bg}$ (bandgap) reference voltage provided at one of the inputs of amplifier 602 may be designed to have a near-zero temperature coefficient. Also, resistance 620 and resistance 622 may be implemented as single respective resistors or as respective combinations of different type resistors to achieve a near-zero temperature coefficient, and therefore as close to a stable value of R as possible.

The respective gates of the output device 618 and sense device 616 may be driven by the same signal. Amplifier 604 may be operated—in accord with transistor 614—to regulate the $V_{DS}$ voltage of the sense device 616 to be equal to the $V_{DS}$ voltage of the output device 618. As a result, the ratio of the currents flowing through the output device 618 and the sense device 616 depends on the ratio N of the (channel width) sizes of the two devices, that is, $I_{SOURCE\_ical}/I_{sense}=N$.

Amplifier 606 is operated to drive the respective gates of the sense device 616 and the output device 618. More specifically, amplifier 606 operates to regulate the gate voltage $V_{GS}$ of the sense device 616 to achieve a fixed ratio $I_{sense}/I_{ref}$ equal to M, where M is a current mirror ratio for the current mirror that includes devices 610 and 612. Therefore the output current $I_{SOURCE\_ical}$ of the current-source is given by:

$$I_{SOURCE\_ical}=M*N*V_{bg}/R.$$

The operation of amplifiers 602, 604, and 606 in current-source 600 may therefore be summarized as follows. Amplifier 602 may be operated to generate a reference current $I_{ref}$. Amplifier 606 may be operated to force a constant ratio between the current $I_{sense}$ flowing into sense device 616 and the reference current $I_{ref}$ flowing through resistor 620. That is, amplifier 606 may be operated to regulate the $V_{GS}$ of the current-sense device 616. Amplifier 604 may be operated to force a constant ratio between the output current $I_{SOURCE\_ical}$ and the sense current $I_{sense}$ flowing into sense device 616. That is, amplifier 604 may be operated to regulate the $V_{DS}$ of the current-sense device 616 to match the value of the $V_{DS}$ of the output device 618. Amplifier 606 may therefore be designed to be slower than amplifier 604 to ensure that the regulation loops of amplifiers 604 and 606 do not conflict with each other. Specifically the unity gain frequency of amplifier 606 may be designed to be much lower than the corresponding value in amplifier 604.

When resistors 620 and 622, both having a nominal value R, are configured on-chip, the nominal value R may vary from sample to sample due to process variations. During production testing and calibration of the controller IC (e.g. controller 156), $I_{SOURCE\_ical}$ may be measured, and its value may be stored in memory (e.g. memory 162). Limiting the variation of $I_{ref}$ ($I_{ref}=V_{bg}/R$) to 1% to 2% may lead to the elimination of the need to also measure and store the temperature coefficient of $I_{SOURCE\_ical}$. It should be noted that in other embodiments, amplifier 602, MOSFET 608 and resistor 620 may be eliminated from the circuit of FIG. 6 without affecting the operation of the current sink circuit 600 (by connecting $V_{bg}$ directly to the inverting input of amplifier 606).

It should also be noted that while various embodiments disclosed herein include a specific type (Buck) voltage regulator, the auto-calibration methods described herein may be equally applied to other types of power regulators where calibration is beneficial.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. An electronic circuit comprising:
   a first pin configured to couple to an output node of a power converter;

an integrated current-source with an output terminal coupled to the first pin; and control circuitry configured to:
- activate the integrated current-source, wherein the activated current source causes a ramping output voltage at the output node of the power converter;
- begin current-sense calibration once the output voltage reaches a specified calibration voltage value;
- regulate the output voltage to the specified calibration voltage value while current-sense calibration is being performed until the current-sense calibration has completed; and
- disable the integrated current-source once the current-sense calibration has completed;

wherein the specified calibration voltage value is less than a specified regulation value to which the output voltage is regulated during normal operation.

2. The electronic circuit of claim 1, wherein the control circuitry is further configured to:
resume ramping the output voltage until it reaches the specified regulation value once the integrated current-source has been disabled upon completion of the current-sense calibration.

3. The electronic circuit of claim 2, wherein the control circuitry is further configured to continue regulating the output voltage to the specified regulation value once the output voltage reaches the specified regulation value, as part of a regular operation of the power converter.

4. The electronic circuit of claim 1, wherein the control circuitry is configured to determine, during the current-sense calibration, a value of a current-sense element configured in the power converter.

5. The electronic circuit of claim 4, wherein the current-sense element is a DC resistance of a low-side transistor device configured in an output power stage of the power converter.

6. The electronic circuit of claim 4, further comprising a non-volatile memory element configured to store the determined value of the current-sense element.

7. The electronic circuit of claim 6, wherein the control circuitry is configured to:
- measure a temperature of the current-sense element during the current-sense calibration;
- determine a temperature coefficient of the current-sense element from the measured temperature and the determined value of the current sense element; and
- store the determined temperature coefficient of the current-sense element in the non-volatile memory element.

8. The electronic circuit of claim 7, wherein the control circuitry is configured to use the stored determined value of the current-sense element and the stored determined temperature coefficient of the current-sense element to measure a current flowing through the current-sense element during regular operation of the power converter.

9. The electronic circuit of claim 6, wherein the control circuitry is configured to use the stored determined value of the current-sense element to measure a current flowing through the current-sense element during regular operation of the power converter.

10. The electronic circuit of claim 4, wherein to determine the value of the current-sense element, the control circuitry is configured to measure a voltage drop developed across the current-sense element in response to the control circuitry activating the integrated current-source.

11. The electronic circuit of claim 10, wherein the control circuitry is configured to:
consecutively measure the voltage drop multiple times;
complete the current-sense calibration when a difference between two consecutive measurements of the voltage drop is less than a specified percentage.

12. The electronic circuit of claim 1, further comprising a current-sense amplifier configured to sense a voltage drop across the current-sense element;
wherein the control circuitry is configured to increase a gain of the current-sense amplifier during current-sense calibration to reduce an impact of quantization error due to a low value of a current sunk by the integrated current-source during current-sense calibration.

13. The electronic circuit of claim 1, further comprising a non-volatile memory element configured to store a measured value of a current sunk by the integrated current-source during a calibration of the integrated current-source.

14. The electronic circuit of claim 1, further comprising driver circuitry controlled by the control circuitry, and configured to drive a power stage of the power converter.

15. A method for performing current-sensing auto-calibration in a power converter having an output, the method comprising:
- activating an integrated calibration current-source, wherein said activating causes current to sink from the power converter;
- outputting a ramping output voltage at the output of the power converter responsive to said activating the integrated calibration current-source;
- performing current-sense calibration responsive to the ramping output voltage reaching a specified calibration voltage value;
- regulating the output voltage to the specified calibration voltage value during said performing current-sense calibration until said performing current-sense calibration is completed;
- disabling the integrated calibration current-source once said performing current-sense calibration is completed;
- the power converter resuming ramping the output voltage responsive to said disabling the integrated calibration current-source; and
- regulating the output voltage to a specified regulation voltage value that is higher than the specified calibration voltage value, once the ramping output voltage reaches the specified regulation voltage value.

16. The method of claim 15, wherein the specified calibration voltage value is at least one order of magnitude lower than the specified regulation voltage value.

17. The method of claim 15, wherein said performing current-sense calibration comprises determining a value of a current-sense element configured in the power converter.

18. The method of claim 17, wherein the current-sense element is a DC resistance of a low-side transistor device configured in an output power stage of the power converter.

19. The method of claim 17, further comprising storing the determined value of the current-sense element in a non-volatile memory element.

20. The method of claim 19, wherein said performing current-sense calibration further comprises:
- measuring a temperature of the current-sense element; and
- determining a temperature coefficient of the current-sense element from the measured temperature and the determined value of the current sense element;
wherein the method further comprises storing the determined temperature coefficient of the current-sense element in the non-volatile memory element.

21. The method of claim 20, further comprising measuring a current flowing through the current-sense element during regular operation of the power converter by using the stored determined value of the current-sense element and the stored determined temperature coefficient of the current-sense element.

22. The method of claim 19, further comprising measuring a current flowing through the current-sense element during regular operation of the power converter by using the stored determined value of the current-sense element.

23. The method of claim 17, wherein said determining the value of the current-sense element comprises measuring a voltage drop developed across the current-sense element responsive to said activating the integrated calibration current-source.

24. The method of claim 23, further comprising:
consecutively measuring the voltage drop multiple times;
completing said performing current-sense calibration when a difference between two consecutive measurements of the voltage drop is less than a specified percentage.

25. The method of claim 15, further comprising:
a current-sense amplifier sensing a voltage drop across the current-sense element; and
increasing a gain of the current-sense amplifier during said performing current-sense calibration to reduce an impact of quantization error due to a low value of a current sunk by the integrated current-source during said performing current-sense calibration.

26. The method of claim 15, further comprising measuring, and storing in a non-volatile memory element a value of a current sunk by the integrated current-source during a calibration of the integrated current-source.

27. An electronic system comprising:
one or more system components configured to receive one or more supply voltages to perform specified system functions; and
one or more power converters configured to provide the one or more supply voltages, wherein at least one power converter of the one or more power converters comprises:
a power stage configured to provide an output voltage; and
a control block coupled to the power stage, and configured to:
activate an integrated current-source, wherein the activated current source causes current to sink from the power stage, and ramp up the output voltage once the integrated current-source has been activated;
perform current-sense calibration once the output voltage reaches a specified calibration voltage value;
regulate the output voltage to the specified calibration voltage value while performing the current-sense calibration until the current-sense calibration has been completed; and
disable the integrated current-source once the current-sense calibration has been completed;
wherein the specified calibration voltage value is less than a specified regulation voltage value to which the output voltage is regulated during regular operation of the at least one power converter.

28. The electronic system of claim 27, wherein the control block is further configured to resume ramping up the output voltage until it reaches the specified regulation voltage value once the integrated current-source has been disabled.

29. The electronic system of claim 28, wherein the control block is further configured to continue regulating the output voltage to the specified regulation voltage value once the output voltage reaches the specified voltage regulation value.

30. The electronic system of claim 27, wherein the control block is configured to determine, during the current-sense calibration, a value of a current-sense element configured in the power converter.

31. The electronic system of claim 30, wherein the current-sense element is a DC resistance of a low-side transistor device configured in the power stage of the power converter.

32. The electronic system of claim 30, further comprising a non-volatile memory element configured to store the determined value of the current-sense element.

33. The electronic system of claim 32, wherein the control circuitry is configured to use the stored determined value of the current-sense element to measure a current flowing through the current-sense element during regular operation of the at least one power converter.

34. The electronic system of claim 30, wherein to determine the value of the current-sense element, the control block is configured to measure a voltage drop developed across the current-sense element in response to the integrated current-source sinking current from the power stage.

35. The electronic system of claim 34, wherein the control block is configured to:
consecutively measure the voltage drop multiple times;
complete the current-sense calibration when a difference between two consecutive measurements of the voltage drop is less than a specified percentage.

36. The electronic system of claim 27, wherein the at least one power converter further comprises a current-sense amplifier configured to sense a voltage drop across the current-sense element;
wherein the control block is configured to increase a gain of the current-sense amplifier during current-sense calibration to reduce an impact of quantization error due to a low value of the current sunk by the integrated current-source from the power stage during current-sense calibration.

37. The electronic system of claim 27, wherein the at least one power converter further comprises a non-volatile memory element configured to store a measured value of a current sunk by the integrated current-source from the power stage during a calibration of the integrated current-source.

38. The electronic system of claim 27, wherein the at least one power converter further comprises driver circuitry controlled by the control block, and configured to drive the power stage.

* * * * *